United States Patent [19]

Ryan et al.

[11] Patent Number: 4,846,954
[45] Date of Patent: Jul. 11, 1989

[54] INCLINATION SENSOR

[76] Inventors: Paul T. Ryan, 23 Meadow Lane, Over, Cambridgeshire, England; Kelvin R. Davis, 15 Walnut Way, Stilton, Cambridgeshire, England, PE7 3X:; Charles W. Wyatt-Millington, 3 Armstrong Close, Perry, Huntingdon, Cambridgeshire, England, PE18 ODP

[21] Appl. No.: 30,804

[22] Filed: Mar. 27, 1987

[30] Foreign Application Priority Data

Mar. 27, 1986 [GB] United Kingdom ............... 8607786

[51] Int. Cl.⁴ .............................................. G01C 9/06
[52] U.S. Cl. ...................................... 33/366; 204/400
[58] Field of Search ........................... 33/366; 204/400

[56] References Cited

U.S. PATENT DOCUMENTS

| | | | |
|---|---|---|---|
| 3,604,275 | 9/1971 | Fox et al. | 74/5.4 |
| 3,992,951 | 11/1976 | Erspamer et al. | 73/497 |
| 4,028,815 | 6/1977 | Buckley et al. | 33/366 |
| 4,167,818 | 9/1979 | Cantarella et al. | 33/366 |
| 4,244,117 | 1/1981 | Cantarella et al. | 33/366 |
| 4,503,622 | 3/1985 | Swartz et al. | 33/366 |
| 4,528,760 | 7/1985 | Plummer | 33/366 |
| 4,672,753 | 6/1987 | Kent et al. | 33/366 |

FOREIGN PATENT DOCUMENTS 0117226  8/1984  European Pat. Off. ............. 33/366
1495489  12/1977  United Kingdom .

Primary Examiner—John F. Niebling
Assistant Examiner—Kathryn Gorgos
Attorney, Agent, or Firm—Chilton, Alix & Van Kirk

[57] ABSTRACT

An inclination sensor is disclosed which includes a capsule 15 containing a conductive liquid 17 which forms a liquid pendulum and having first and second resistive tracks 11, 13. In a first measuring configuration, the terminals A, B of track 11 are connected to positive and negative voltages respectively and the terminals C, D of resistive track 13 are connected together, to form a sensing electrode. The voltage at terminal B is then adjusted so that the voltage at common electrode C, D, sensed through the conductive liquid 17 is adjusted to be zero. The ratio of voltages at terminals A and B is then related to the position of the conductive liquid 17 relative to the resistive track 11 and thus of the inclination of the capsule relative to horizontal. In an alternative measuring configuration, the roles of the resistive tracks 11, 13 are reversed, to allow the sensor to measure angles in a different angular range.

11 Claims, 2 Drawing Sheets

INCLINATION SENSOR

This invention relates to a device and more particularly, but not exclusively, to a sensor for an electronic level or inclination gauge.

Optical levels, more commonly called spirit levels, are well known and provide an optical indication of whether or not a surface is horizontal, based on the principle of an air bubble in a liquid-filled vial always seeking the highest point in the vial, the vial being slightly curved so that when level, the bubble will always take up an equilibrium position. Such bubble levels, if disposed in a suitable frame, can also be used to provide an indication of whether or not a surface is vertical.

However, such spirit levels are not capable of measuring deviations from horizontal or vertical outside a very limited range. Also, such spirit levels can be difficult to read accurately as the measurement of whether a surface is level or plumb depends on the ability of the user to determine the position of the bubble. Factors such as poor lighting or poor eyesight obviously affect this.

An electronic spirit level has been proposed by Cantarella, in U.S. Pat. No. 4,167,818, which uses a capsule partly-filled with a conductive liquid. Five electrodes are disposed within the capsule. The resistance between the electrodes is dependent on the position of the liquid within the capsule which, in turn, is dependent upon its inclination. A digital readout of angles of inclinations of a surface from level or from plumb is provided. However, this level, again, is only usable over a limited range of angular deviation from either horizontal or vertical positions. Also, the number and disposition of the electrodes make the design complicated and difficult to manufacture.

It is an object of the invention to provide an inclination sensing device of reduced complexity, with respect to the prior art.

According to the invention, there is provided an inclination sensor comprising a receptacle containing an electrically conductive liquid, a first electrode arranged to have first and second voltages applied to spaced points thereof, the liquid being arranged to contact the first electrode between said points at a position which varies in dependence upon inclination of the sensor about a reference axis, a second electrode arranged in contact with the liquid and measuring circuitry associated with the first and second electrodes for deriving the inclination of the sensor about the reference axis.

It is a preferred feature of this aspect of the invention that the measuring circuitry comprises means for sensing an electrical quantity at the second electrode and adjusting at least one of the voltages applied to the spaced points of the first electrode so that the electrical quantity at the second electrode is a predetermined value. The adjusted value voltage(s) being indicative of the angle of inclination of the sensor about the reference axis.

Preferably, the different voltages have positive and negative values respectively. The electrical quantity is current and the predetermined value is zero.

It is a preferred feature that a switching circuit is provided for applying the different voltages to the respective spaced points of the second electrode and for sensing the electrical quantity at the first electrode so that the functions of the first and second electrodes can be reversed.

Furthermore, the electrodes may be of part-annular form; each electrode having a gap between the ends thereof. The gaps is disposed so that at least one gap is not covered by the liquid for any angle of rotation of the capsule about the reference axis. This provides the advantage that for any angle of rotation of the capsule, an electrode selected by the switching circuit can have the different voltages applied to its respective ends without the liquid bridging the selected electrode across the gap between its ends, which would nullify the measurement. Thus, with this configuration, the sensor can be used to measure a full 360° of rotation about the reference axis using only two electrodes.

It is a further preferred features that the first and second electrodes comprise part-annular resistive tracks concentrically disposed about the reference axis, each having uniform resistivity per unit length, this configuration allowing simple processing circuitry to be employed.

An embodiment of the invention will now be described, by way of example, with reference to the accompanying drawings in which FIG. 1 is a perspective view of an inclination sensor, forming part of an embodiment of the inclination gauge of the invention.

Figure 1:
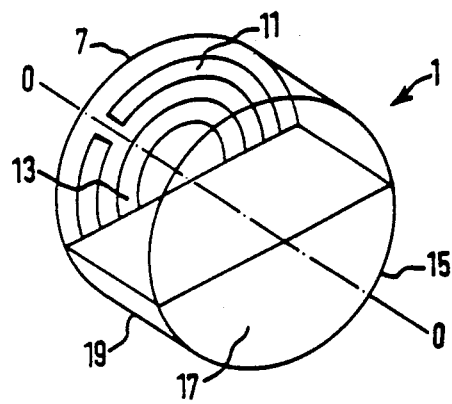
Figure 2:
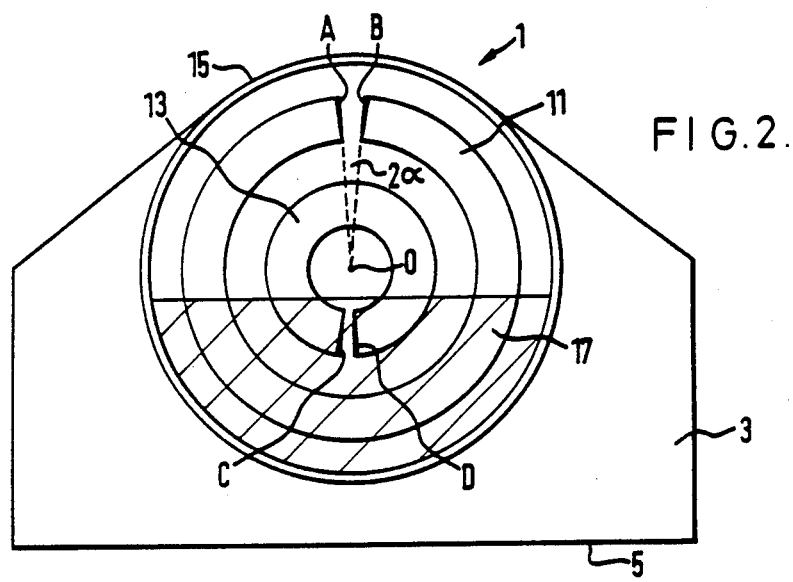
FIG. 2 is a sectional view of the sensor shown in FIG. 1 arranged in a mounting block.

In FIG. 1, an inclination sensor generally designated 1 is shown. The sensor 1 is mounted in a housing 3 as schematically shown in FIG. 2, the housing 3 having an edge 5 which is presented to a surface, the inclination of which is to be measured.

The sensor 1 includes a base mamber 7 preferably formed from ceramic material. On the base member 7 are mounted two part-annular electrodes formed as resistive inner and outer tracks 11,13 having a constant resistance per unit length and being concentrically disposed about reference axis O. The tracks 11,13 are preferably formed from CERMET (Trade Name) and are provided respectively with terminals A,B and C, D at the ends thereof. The gap between terminals A,B and the gap betwen terminals C,D are disposed so as to oppose one another across the reference axis O. The terminals A-D are connected to processing circuitry to be described below.

The base member 7 is connected in sealing engagement with a cup-shaped container 15 thus forming a capsule 19. The container 15 is moulded from a plastics material preferably a thermo-plastic polyester (e.g. PBT). A conductive liquid 17, for example methyl alcohol (optionally with a salt and a surfacant), is disposed within the capsule in contact with the tracks 11,13, the capsule being filled to less than half its volume so that, when inclined at 90°, the liquid does not cover the gap between terminals A,B.

In use, one resistive track e.g. 13 is used as a sensing element and the terminals C,D thereof are connected together to form a common terminal. A positive voltage is then applied to one terminal (A) and a negative voltage is applied to the other terminal (B) of the other resistive track 11, so that current flows through the resistive track 11. As the track 11 has a uniform resistance, a constant potential gradient will exist along it and as the voltage 5 applied at terminals A,B are of opposite plurality, a zero volt equipotential will exist at some point along the track.

Figure 3:
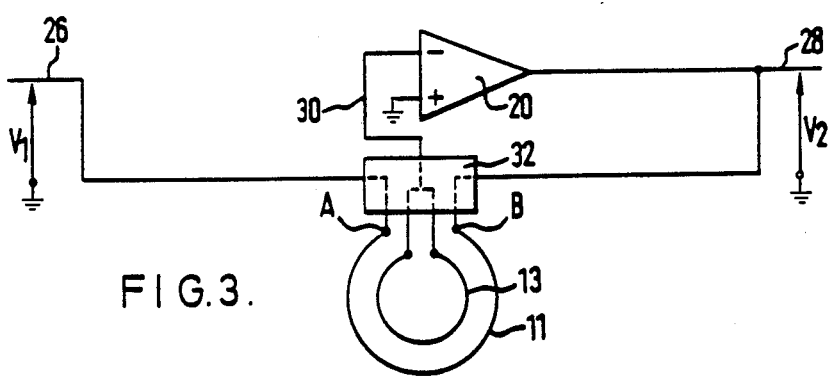
FIG. 3 is a diagram illustrating the processing circuitry for the sensor shown in FIGS. 1 and 2.

Also, as part of the tracks 11,13 are immersed in the conductive liquid 17, an electrical circuit may be formed between the outer track 11 and inner track 13 through the liquid 17. In such a circuit, if the integral of the voltage over the area of the track 11 immersed in the liquid 17 is non-zero, and track 13 is connected to a terminal 30 (a virtual earth) as shown in FIG. 3, a current will flow from track 11 through liquid 17 to track 13 or vice versa. However, if the integral of the voltage over the surface immersed in the liquid is zero, no current will flow. Such a situation will occur when the zero volt equipotential is normal to the surface of the liquid, so that the field distribution in the liquid is symmetrical about the radius normal to the fluid surface.

Figure 4A:
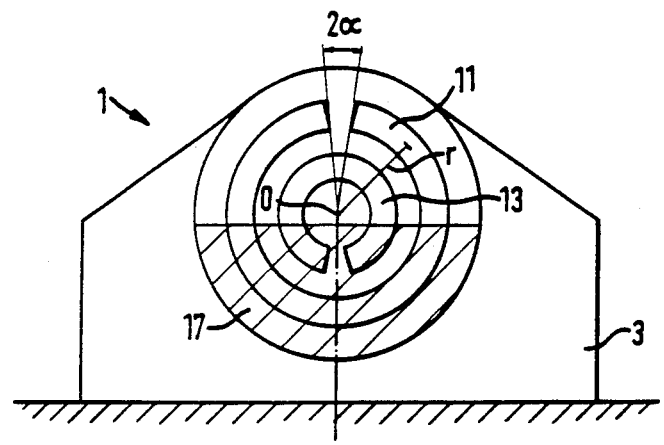
FIGS. 4a and 4b illustrate the inclination sensing device in different orientations.
Figure 4B:
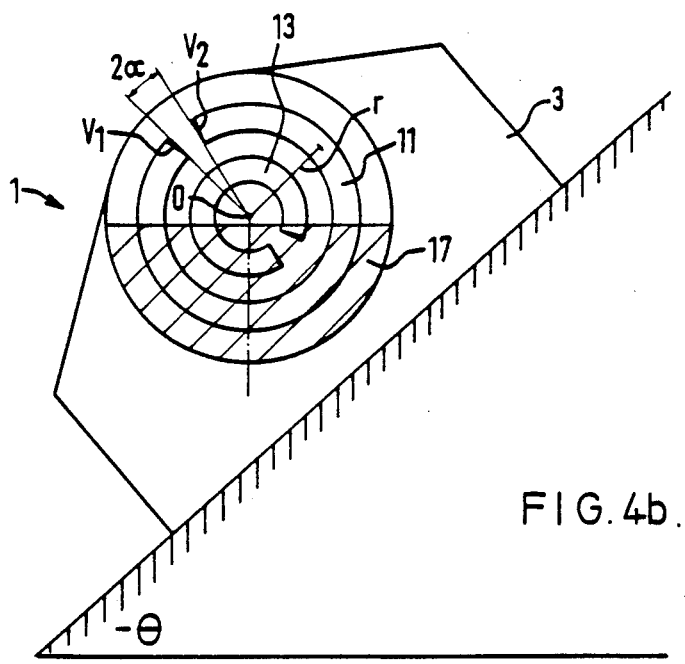

The mode of operation of the inclination gauge is to adjust the voltage at terminal B so as to move the zero volt equipotential along the track 11 until the condition of zero current flow through the sensor track 13 is satisfied. The ratio ($\gamma$) of the voltages $V_1$, $V_2$ at terminals A and B will then be related to the angle of inclination $\theta$ of the sensor as follows:

With reference to FIG. 2, 4a and 4b, let the voltage along track 11 where the track crosses the centre line 32 0 then:

$$\text{Potential Gradient at radius } r = \frac{V_1}{(\pi + \theta - \alpha)r} \quad (1)$$

$$= \frac{(V_1 - V_2)}{(2\pi - 2\alpha)r} \quad (2)$$

Equating 1 and 2 and collecting terms gives:

$$(V_1 - V_2)\theta = (V_1 + V_2)(\pi - \alpha)$$

$$\text{So: } \theta = \frac{(V_1 + V_2)(\pi - \alpha)}{(V_1 - V_2)} \quad (3)$$

Let $V_1 = \gamma V_2$   4
Combining 3 and 4 gives:
Combining 3 and 4 gives:

$$\theta = \frac{(1 + \gamma)(\pi - \alpha)}{(\gamma - 1)} \quad (5)$$

Where
$\alpha$ is half the angle subtended by the gap in the resistive track at the centre thereof,
$\theta$ = angle of inclination (positive clockwise).
In general $\gamma < 0$.

Thus, by adjusting the voltage $V_2$ so that the net voltage applied to track 13 is zero, and measuring the ratio of the voltages $V_1$, $V_2$ applied to the track 11, the angle of inclination of the sensor 1 about axis O can be calculated.

A processing circuit for providing this mode of operation is illustrated in FIG. 3 and comprises a switching circuit 32 to which terminals 26, 28 and 30 are connected. The switching circuit 32 serves to connect a selected pair (e.g. C,D) of the terminals A,B or C,D to terminal 30 the non-selected pair of terminals (e.g. A,B) being connected, respectively, to terminals 26,28. Terminal 30 is connected to the inverting input of an operational amplifier 20, with the output of the operational amplifier 20 being connected to terminal 28.

If a positive voltage V1 is applied at terminal 26 a negative, output voltage V2 will be produced in dependence upon the characteristics of the inverting amplifier 20, and sensor 1. Assuming an initially null position as shown in FIG. 4a, if the sensor 1 is shifted to angle $-\theta$ as shown in FIG. 4b, the orientation of fluid 17 in relation to the track 11 changes resulting in a net positive voltage being developed along that part of the track 11 immersed in fluid 17, resulting in a flow of current through liquid 17 to track 13. This, through the action of operational amplifier 20, causes the voltage V2 to become more negative, thus moving the zero volt equipotential along track 11 towards terminal B, which in turn produces an adjustment in the flow of current to track 13 and so on until the voltage V2 has been adjusted so that the zero volt equipotential is normal to the liquid surface and no current flows through liquid 17 to track 13. The voltages V1, V2 can then be measured by conventional means and the voltage ratio V1/V2 and hence the angle of inclination of the capsule calculated by processing circuitry (not shown).

The gain of amplifier 20 is arranged to be adequately high to ensure that any error voltage at its input is negligible.

Measurements of angles of inclination of slightly greater than ±90° can be made by connecting voltages V1, V2 by terminals A,B However, for those angles at which the liquid 17 covers the gap between terminals A,B, the liquid will bridge the gap introducing a non-linearity to the circuit gap. In order to measure angles within this range, the switching circuit 32 operates to change the modes of the two tracks 11,13, the track 11 being switched so that terminals A,B are connected to terminal 30 and the track 13 being switched so as to be connected between terminals 26,28. The configuration illustrated, in which the gap between the terminals A,B is opposed to the gap between terminals C,D, when combined with the chosen level of liquid 17, ensures that one gap will not be covered with liquid for any angle of rotation of the capsule about axis O, thus allowing 360° of inclination measurement.

The determination of which track is selected as the sensor may be made by determining if the ratio V1/V2 lies within a predetermined range for one track and switching the tracks if the ratio is outside the predetermined range.

Although the invention has been described with reference to a sensor using two resistive tracks, this is not to be construed as limitative, and a sensor with one track and a single sensing terminal, for sensing the current could be provided for measuring inclination over a limited range of angles.

Also, the circuit means could sense a current into the sensing track other than zero, and the terminal 30 could be at any fixed potential, with suitable compensation being made in the processing circuitry.

The processing circuitry is preferably formed as an integrated circuit attached to the substrate 3.

The applied voltage V1 may be alternating or of fixed potential.

Although use of a conductive liquid and measuring technique are disclosed a liquid and measuring technique of any phase angle of impedance could be used.

We claim:
1. An inclination sensor comprising a receptacle containing an electrically conductive liquid, a first elec- trode arranged to have first and second voltages applied to spaced points thereof, the liquid being arranged to contact the first electrode between said points at a position which varies in dependence upon inclination of the sensor about a reference axis, a second electrode arranged in contact with the liquid and measuring circuitry associated with the first and second electrodes for deriving the inclination of the sensor about the reference axis, wherein said first and second electrodes each comprise resistive tracks disposed about the reference axis, each track having substantially uniform resistivity per unit length.

2. A sensor as claimed in claim 1 wherein the measuring circuitry comprises means for sensing an electrical quantity at the second electrode and adjusting at least one of the voltages applied to the spaced points of the first electrode so that the electrical quantity at the second electrode is a predetermined value, the adjusted voltage(s) being indicative of the angle of inclination of the sensor about the reference axis.

3. A sensor as claimed in claim 2 wherein the different voltages have positive and negative values respectively, the electrical quantity is current and the predetermined value is zero.

4. A sensor as claimed in claim 2 further comprising switching means for reversing the connections to the first and second electrodes whereby the different voltages are applied to respective spaced points of the second electrode and the sensing means senses the electrical quantity at the first electrode.

5. A sensor as claimed in claim 1 wherein the first and second electrodes are of part-annular form, each having a gap between the ends thereof, the gaps being disposed so that at least one gap is not covered by the liquid for any angle of rotation of the capsule about the reference axis.

6. A sensor as claimed in claim 5 wherein the gaps are disposed to face one another across the reference axis.

7. A sensor as claimed in claim 6 wherein the receptacle is partially filled with the conductive liquid in a predetermined amount enabling rotation of the capsule through at least 90° without resulting in both said gaps being simultaneously covered with the liquid.

8. A sensor as claimed in claim 1 wherein the receptacle is formed from a cup formed from plastics material and a member for sealing the cup.

9. A sensor as claimed in claim 1 wherein the conductive liquid includes methyl alcohol.

10. A sensor as claimed in claim 1 wherein the measuring circuitry is sensitive to the resistive impedance of the conductive liquid for deriving the inclination of the sensor.

11. An electronic level or inclination gauge including a sensor as set for in claim 1.

* * * * *